US008208152B2

(12) United States Patent
Hanson et al.

(10) Patent No.: US 8,208,152 B2
(45) Date of Patent: Jun. 26, 2012

(54) PRINTER CONTROLLED DEFAULT DRIVER CONFIGURATION

(75) Inventors: Mark L. Hanson, Tigard, OR (US); David M. Chapin, Gresham, OR (US); Jonathan Edmonds, Silverton, OR (US); Patrick Kevin Sheehan, Clackamas, OR (US)

(73) Assignee: Xerox Corporation, Norwalk, CT (US)

( * ) Notice: Subject to any disclaimer, the term of this patent is extended or adjusted under 35 U.S.C. 154(b) by 1628 days.

(21) Appl. No.: 11/047,834

(22) Filed: Jan. 31, 2005

(65) Prior Publication Data

US 2006/0170943 A1 Aug. 3, 2006

(51) Int. Cl.
*G06F 3/12* (2006.01)
*G06F 9/44* (2006.01)

(52) U.S. Cl. ...... 358/1.15; 358/1.13; 719/321; 719/327; 717/174

(58) Field of Classification Search ................. 358/1.13, 358/1.15, 1.1, 1.6, 1.12–1.16, 1.9; 719/327; 709/203, 232, 237, 220; 717/176
See application file for complete search history.

(56) References Cited

U.S. PATENT DOCUMENTS 5,566,278 A * 10/1996 Patel et al. .................. 358/1.15
5,692,111 A * 11/1997 Marbry et al. .............. 358/1.15
6,088,120 A 7/2000 Shibusawa et al. .......... 358/1.15
6,266,693 B1 7/2001 Onaga .......................... 709/219
6,301,012 B1 * 10/2001 White et al. ................ 358/1.15
6,426,798 B1 * 7/2002 Yeung .......................... 358/1.13
6,542,892 B1 4/2003 Cantwell ......................... 707/10
6,612,566 B2 9/2003 Stoll ............................ 271/186
6,634,820 B2 10/2003 Kobayashi et al. ........... 400/709
6,637,876 B2 10/2003 Hori ............................ 347/100
6,748,183 B2 6/2004 Edmonds ........................ 399/23
6,775,019 B1 8/2004 Sakurai et al. ............... 358/1.15
6,967,728 B1 * 11/2005 Vidyanand .................. 358/1.15
7,016,740 B2 * 3/2006 Nakamura et al. ............. 700/19
7,177,040 B2 * 2/2007 Roosen et al. .............. 358/1.15
7,213,060 B2 * 5/2007 Kemp et al .................... 719/327
7,461,375 B2 * 12/2008 Kazumi et al. ................ 717/176
7,640,368 B2 * 12/2009 Kim et al. ......................... 710/8
7,689,673 B2 * 3/2010 Kemp et al. .................. 709/220
7,895,609 B2 * 2/2011 Inoue ............................ 719/327
7,903,267 B2 * 3/2011 Yasui et al. .................. 358/1.13
2002/0120792 A1 8/2002 Blair et al. .................... 709/330
2003/0030664 A1 * 2/2003 Parry ........................... 345/744
2003/0046674 A1 * 3/2003 Gentry et al. ................ 717/171
2003/0051011 A1 3/2003 Schacht et al. ................ 709/221
2003/0103235 A1 6/2003 Gomi .......................... 358/1.15

(Continued)

*Primary Examiner* — Twyler Haskins
*Assistant Examiner* — Dennis Dicker
(74) *Attorney, Agent, or Firm* — Luis M. Ortiz; Kermit D. Lopez; Tuesday A. Kaasch

(57) ABSTRACT

Methods and systems for permitting a rendering device, such as a printer, to be automatically configured at the time of device driver installation, regardless of the means utilized to install the driver are disclosed. In general, a device driver (e.g., a printer driver) is associated with the rendering device. The device driver includes a driver default configuration. The driver default configuration can be initially set in the rendering device via an embedded network server (e.g., an embedded web server) in the rendering device. The driver installer can then query the driver default configuration as set on the rendering device. The driver can then be automatically adjusted prior to the installation of the driver, in response to querying the driver default configuration by the driver installer. The rendering device can be implemented as a printer, a scanner, a multi-function device, a photocopy machine, and the like.

16 Claims, 3 Drawing Sheets

U.S. PATENT DOCUMENTS

2003/0120624 A1* 6/2003 Poppenga et al. ................ 707/1
2003/0160989 A1* 8/2003 Chapin et al. ................ 358/1.13
2003/0169444 A1* 9/2003 Kemp et al. .................. 358/1.15
2003/0184781 A1* 10/2003 Laughlin ...................... 358/1.13
2003/0184782 A1* 10/2003 Perkins et al. ............... 358/1.13
2003/0184784 A1* 10/2003 Ferlitsch ...................... 358/1.13
2003/0193687 A1* 10/2003 Parry .......................... 358/1.15
2003/0200289 A1 10/2003 Kemp et al. ................... 709/221
2003/0200291 A1* 10/2003 Kemp et al. ................... 709/222
2003/0217194 A1* 11/2003 Kazumi et al. ................ 709/321
2004/0057072 A1* 3/2004 Borchers et al. ............. 358/1.15
2004/0070640 A1* 4/2004 Ferlitsch ........................ 347/19
2004/0105112 A1* 6/2004 Ishihara et al. .............. 358/1.13
2004/0114180 A1 6/2004 Karaoguz et al. ............ 358/1.15
2005/0128501 A1* 6/2005 Choi et al. ................... 358/1.13
2005/0146731 A1* 7/2005 Mitani .......................... 358/1.1
2006/0095924 A1* 5/2006 Inoue ........................... 719/327
2007/0182978 A1* 8/2007 Nakamura et al. ........... 358/1.13
2008/0079975 A1* 4/2008 Ferlitsch et al. ............. 358/1.13

* cited by examiner

NETWORK
114
110
112
106
108
100
102
104

PRINTER CONTROLLED DEFAULT DRIVER CONFIGURATION

TECHNICAL FIELD

Embodiments are generally related to data-processing methods and systems. Embodiments are additionally related to computer networks. Embodiments are also related to rendering devices, such as printers, scanners, multi-function devices, photocopy machines, and the like. Embodiments are additionally related to rendering device drivers and driver configuration applications.

BACKGROUND OF THE INVENTION

Two prominent network-printing models currently operate in conventional printing environments. The first is the client-server model, an example of which is the "print queue" commonly employed in client-server networked printing. In the client-server model, files can be stored on a centralized high-speed file server that is made available to client computers. A rendering device, such as a printer, for example, can communicate with the server. The advantage of the client-server model is that in many operating systems, an administrator can configure the default printer driver settings on an associated print server. The print server can be implemented as a workstation or other computer that is dedicated to managing printers on a network. The print server can be implemented as any computer or workstation on the network.

The second prominent model is peer-to-peer network printing, a type of printing that operates in so-called peer-to-peer networks. In the peer-to-peer network-printing model, users can print directly to the printer or other rendering device from their printer driver. Peer-to-peer networks are commonly employed in smaller networking environments, such as offices. In such environments, an administrator may not possess the option to install a print server, or may have access to a print server, but not a particular type of print server. The print server used may also form a part of the printer. The administrator or another user may, however, desire to configure the printing defaults. Currently, an automated method or system does not exist, which offers this feature as an option at printer installation time.

BRIEF SUMMARY

It is a feature of the present invention to provide improved data-processing methods and systems.

It is also a feature of the present invention to provide improved methods and systems for configuring rendering devices, such as printers, scanners, multi-function devices, photocopy machines, and the like.

It is also a feature of the present invention to provide improved printer driver methods and systems.

It is an additional feature of the present invention to provide improved printer driver installer methods and systems.

Aspects of the present invention relate to methods and systems for permitting the driver for a rendering device, such as a printer, to be automatically configured at the time of installation. In general, a rendering device driver (e.g., a printer driver) is associated with a rendering device. A driver default configuration differing from the default can be initially set in the rendering device via an embedded network server (e.g., an embedded web server). The embedded network server communicates with and/or forms a part of the rendering device. The driver can then query the rendering device for the driver default configuration stored on the rendering device. The driver configuration can then be automatically adjusted prior to the use of the driver configuration, in response to querying the driver default configuration settings on the rendering device by the driver installer. The rendering device can be implemented as a printer, a scanner, a multi-function device, a photocopy machine, and the like.

The method and systems discussed herein can therefore automatically configure a printer driver's default settings. Such default settings are those settings that are set when a user selects a printing option, but prior to the user customizing the settings for their print or rendering job. A device administrator can first specify the device driver's default configuration, which can also be referred to as the "driver default settings". The driver configuration is generally kept on the device itself and is accessible and modifiable by the system administrator via the device's web page or local UI. During the driver installation process, the device's printer driver installer queries the device to acquire the default driver configuration. The installer then installs the driver with these settings as the driver default settings. The advantage of such embodiments is the ability to efficiently manage specifying the default settings of a printer driver in a multiple user environment.

BRIEF DESCRIPTION OF THE DRAWINGS

The particular values and configurations discussed in these non-limiting examples can be varied and are cited merely to illustrate one or more embodiments and are not intended to limit the scope thereof.

DETAILED DESCRIPTION OF THE INVENTION

The particular values and configurations discussed in these non-limiting examples can be varied and are cited merely to illustrate embodiments and are not intended to limit the scope of the invention.

Figure 1:
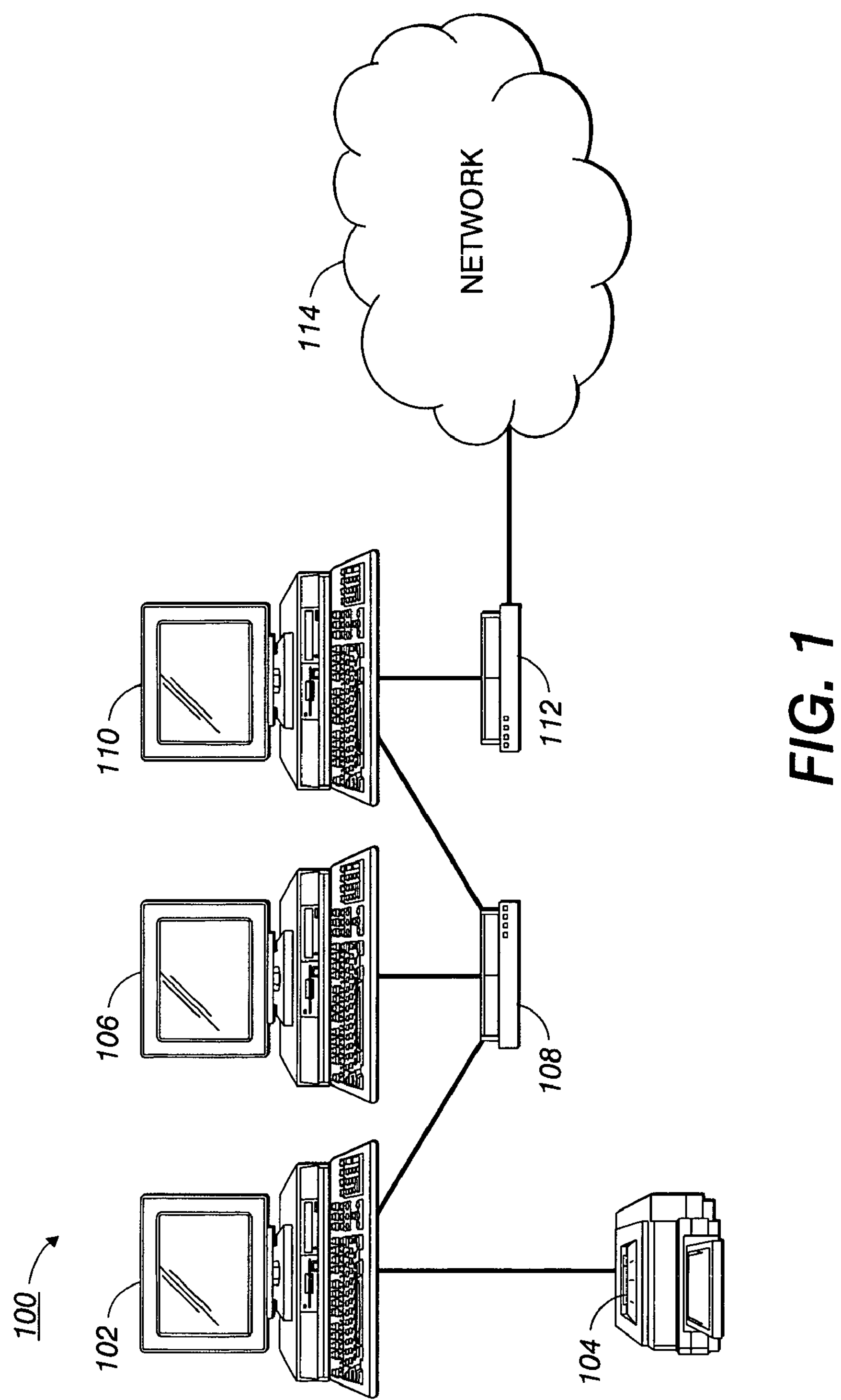
FIG. 1 illustrates a block diagram of a peer-to-peer network that can be implemented in accordance with an embodiment of the present invention.

FIG. 1 illustrates a block diagram of a network 100 that can be implemented in accordance with an embodiment of the present invention. Network 100 can be configured as a peer-to-peer network that permits one or more computers, such as computers 102, 106, and/or 110 to communicate via shared resources. Individual resources, such as disk drives, DVD drives, scanners, printers, photocopy machines and other rendering devices can therefore be utilized as shared resources accessible from every computer 102, 106, 110 within the network 100.

An example of a shared resource that can be utilized via peer-to-peer network 100 is rendering device 104, which can be, for example, a photo copy machine, a scanner, a printer and the like. Note that the term "rendering device" as utilized herein can refer generally to rendering devices such as laser printers, ink-jet printers, photocopy machines, scanner, multi-function devices, and so forth. Note also that although a peer-to-peer network is illustrated in FIG. 1, a variety of other types of networks can be implemented in accordance with embodiments. Network 100 is therefore provided for general edification and illustrative purposes only and is not considered a limiting feature of the embodiments disclosed herein.

In general, computers 102, 106 and 110 can each be connected to a network hub or switch 108. Computer 110 can also communicate with another network 114 utilizing a modem 112. Because memory storage units and/or drives can be shared between computers 102, 106, and/or 110 of network 100, applications only need to be installed on a single computer within network 100 rather than all of the computers. Thus, in peer-to-peer network 100 depicted in FIG. 1, a user of network 100 can print directly to the rendering device 104 from their driver (e.g., a printer driver).

Figure 2:
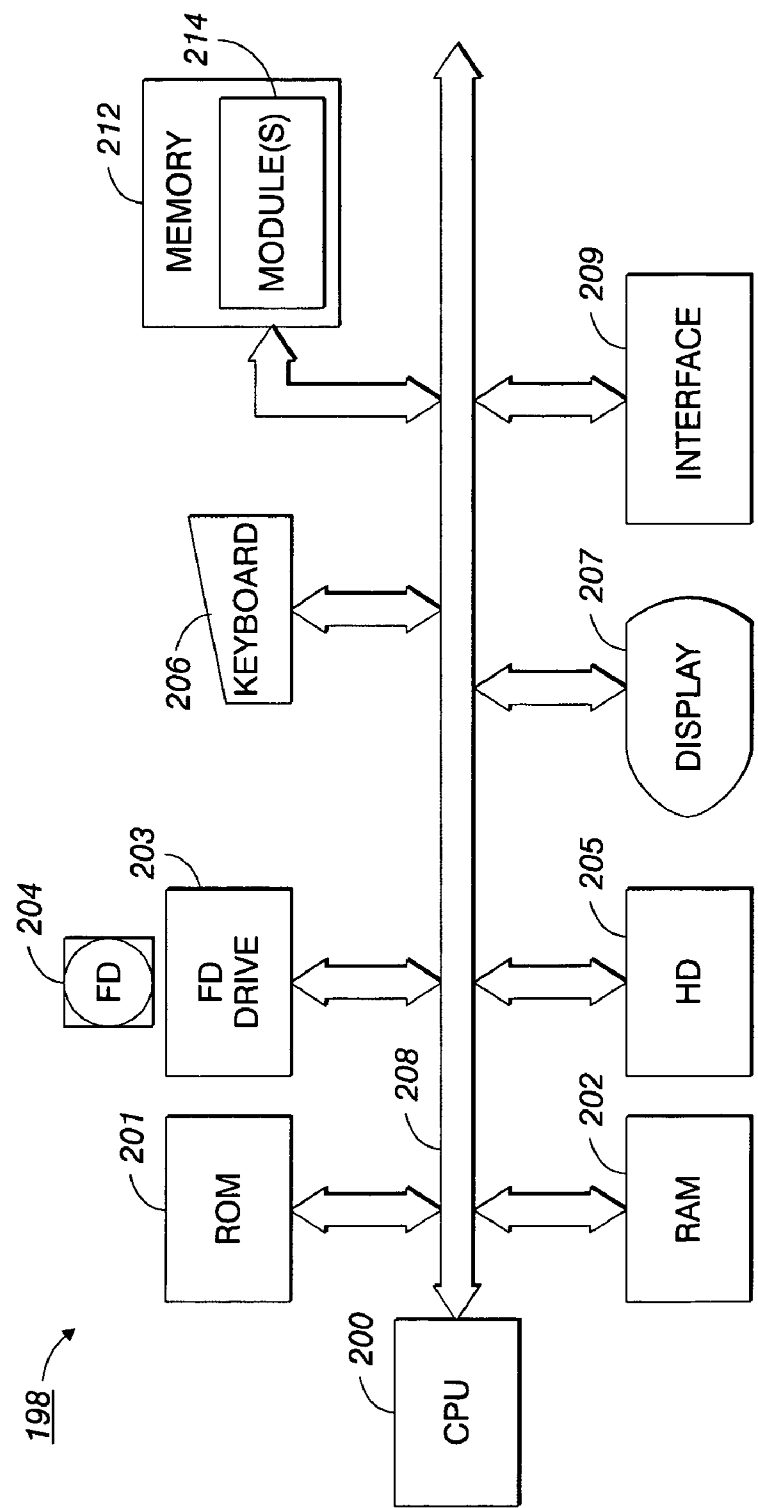
FIG. 2 illustrates a block diagram of an data-processing apparatus, which can be adapted for use with the embodiments disclosed herein.

FIG. 2 illustrates a block diagram of a data-processing apparatus 198, which can be adapted for use with the embodiments disclosed herein. The configuration depicted in FIG. 2 is the same as that of the computers 102, 106, and 110 depicted in FIG. 1, which are data-processing apparatuses. Thus information process apparatus 198 is analogous to computers 102, 106 and 110 illustrated in FIG. 1.

In FIG. 2, data-processing apparatus 198 includes a Central Processing Unit (CPU) 200, which functions as a control means of the data-processing apparatus 198. The CPU 200 performs control in such a way as to execute application programs, printer driver programs, an operating system (OS), a network printer control program according to the present invention, and so forth, which are stored on a hard disk (HD) 205 and temporarily store information needed to execute the programs, files, etc. in a Random Access Memory (RAM) 202. Data-process apparatus 198 can also include a memory 212, which contains one or more modules 214, which are processible via CPU 200. Note that the term "module" is defined in greater detail herein with respect to FIG. 3.

Data-processing apparatus 198 includes a Read Only Memory (ROM) 201, which is a storage means that stores programs including a basic Input/Output (I/O) program as well as various data such as font data used for document processing and template data. RAM 202 functions as a temporary storage means, which functions as a main memory, work area, and the like for the CPU 200.

Data-processing apparatus 198 also can include a floppy (registered trademark) disk (FD) drive 203, which serves as a means for reading a storage medium. Programs and the like stored on an FD 204 which serves as a storage medium are loaded to this computer system through the FD drive 203 as described later with reference to FIG. 5. Incidentally, the storage medium is not limited to the FD, but it may be a CD-ROM, CD-R, CD-RW, PC card, DVD, IC memory card, MO, memory stick, or the like.

Floppy disk (FD) 204 functions as storage medium containing computer-readable programs. Data-processing apparatus 198 also includes a hard disk (HD) 205, an external storage means, which functions as a large-capacity memory and stores the application programs, printer driver programs, OS, network printer control program, and related programs. Furthermore, it can hold a spooler, which functions generally as a spooling mechanism. The spooling means here refers to a client spooler in the case of the client, and a server spooler in the case of the print server. On the print server, the external storage means also stores job information received from the client and a table generated for sequence control.

Data-processing apparatus 198 also includes a keyboard 206, a user input means which allows device control commands or other commands to be entered into the client computer by a user and into the print server by an operator or administrator. Data-processing apparatus 198 further includes a display 207, which is a display means that displays the commands entered on the keyboard 206, status of printers, multi-function rendering devices, scanners, etc. Data-processing apparatus 198 also includes a system bus 208 that manages flows of data in the Data-processing apparatus 198. An interface 209 can also be implemented, which functions as an input/output means through which data is exchanged with external devices.

Figure 3:
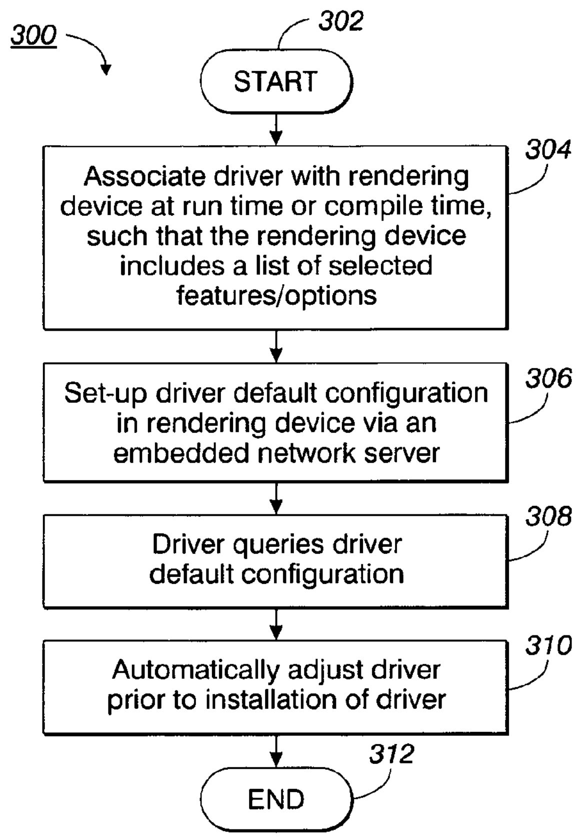
FIG. 3 illustrates a high-level flow diagram depicted logical operational steps that can be implemented, in accordance with a preferred embodiment of the present invention.

FIG. 3 illustrates a high-level flow diagram 300 depicting logical operational steps that can be implemented, in accordance with a preferred embodiment of the present invention. The process can be initiated, as indicated at block 302. Thereafter, as described at block 304, a driver can be associated with a rendering device, such that the rendering device includes a list of current selection options and/or features. The operation depicted at block 304 can be automatically performed at run time or compile time. The driver itself includes a default driver configuration. In one embodiment, for example, an XML control file can be sent to the rendering device with a list of features and/or options. Thus, the rendering device (e.g., a printer) can be provided with foreknowledge from the selected features and/or options. In this sense, if the driver is associated with the rendering device at compile time, a dynamically configurable methodology is implemented.

As indicated next at block 306, the driver default configuration can be set up in the rendering device via an embedded network server, such as, for example, an embedded network server. As illustrated thereafter at block 308, the driver can query the driver default configuration and then, as indicated at block 310, automatically adjusts the driver, prior to the use of the driver configuration, in response to the query operation described at block 308. The process can then terminate, as indicated at block 312. Based on the foregoing, it can be appreciated that the methodology depicted in flow chart 300 depicts steps that can be utilized to implement a driver installer process.

The process described at flow chart 300 can be applied, for example, to the situation of a rendering device, such as a printer, and a driver, such as, for example, a printer driver. The methodology described herein allows the printer driver to be automatically configured upon initialization, regardless of the means utilized to install the printer. Thus, the printer driver default configuration can be set up in the printer through the printer's embedded web server, as depicted at block 306. Then, the printer driver, during the installation process, and prior to the completion of the installation thereof can query the printer driver default configuration, as indicated at block 308, and then make printer driver adjustments accordingly, as depicted at block 310.

Note that as indicated herein, the term "web server" refers generally to a server, typically a computer, which delivers or serves up "web pages". A web server typically possesses a domain name and an IP (Internet Protocol) address. A computer or data-processing apparatus such as data-processing apparatus 198 of FIG. 2 can function as a web server by installing server software that permits the computer or data-processing apparatus to connect to the Internet (e.g., a computer network).

Note that a "network server" or "web server" can also refer to a software module that runs on the server, which permits the server or data-processing apparatus to accept HTTP requests from web browsers and delivering the web pages and other files to them, as well as performing other interactive functions. Note that the term "HTTP" refers generally to HyperText Transfer Protocol, the underlying protocol utilized by the World Wide Web, often referred to simply as the "web". HTTP defines how messages are formatted and transmitted, and what actions web servers and browsers should take in response to various commands. The embedded network server described herein can also be configured as a type of device other than a web server and may communicate the same information over a data communication method other than HyperText Transfer Protocol (HTTP), depending upon design considerations.

The advantage of such a process is that for organizations or offices where client/server methodologies for network printing administration are not being employed (e.g., network 100 of FIG. 1), a tool can be utilized that provides a good deal of the functionality that an administrator might want in order to control the user's initial printing experience. Such a methodology can also offer the advantage that the administrator can set the presets for the automatic driver configuration and can be set up in the printer. A URL (Uniform Resource Locator) for the web installer can be passed to the user and the users can install a driver with the administrator's default driver selections. It is important to note that the embodiments described herein can allow for a change to be made after installation so that driver defaults may be changeable after installation.

It can be appreciated that the methodology disclosed in FIG. 3 can be implemented in the context of so-called "software modules" or modules. Embodiments can be implemented in the context of modules. Such modules can be implemented as instruction modules residing in a computer memory, such as, for example, memory 212 depicted in FIG. 2. In the computer programming arts, a "module" can be typically implemented as a collection of routines and data structures that performs particular tasks or implements a particular abstract data type.

Modules generally are composed of two parts. First, a software module may list the constants, data types, variable, routines and the like that that can be accessed by other modules or routines. Second, a software module can be configured as an implementation, which can be private (i.e., accessible perhaps only to the module), and that contains the source code that actually implements the routines or subroutines upon which the module is based. Thus, for example, the term module, as utilized herein generally refers to software modules or implementations thereof. Such modules can be utilized separately or together to form a program product that can be implemented through signal-bearing media, such as, for example, transmission media and/or recordable media.

Thus, a variety of modules can be implemented to implement the embodiments disclosed. One example of such a module is a module that associates the driver with the rendering device, wherein the driver includes a driver default configuration. Another module can be implemented for initially setting the driver default configuration in the rendering device via the embedded network server, wherein the embedded network server communicates with the rendering device. The driver can provide an additional module for querying the driver default configuration. Also, a module can be provided for automatically adjusting the driver prior to an installation of the driver, in response to querying the driver default configuration by the driver. The driver itself can be implemented, as for example, a printer driver module.

Figure 4:
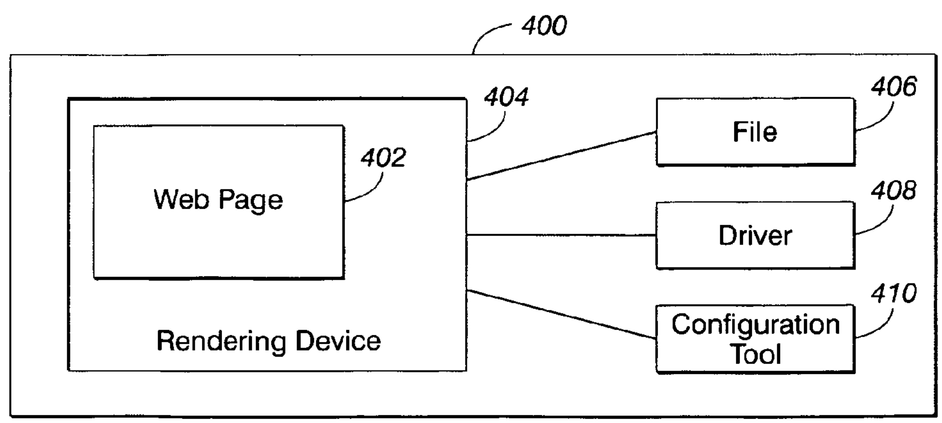
FIG. 4 illustrates a block diagram of a system, which can be implemented in accordance with a preferred embodiment.

FIG. 4 illustrates a block diagram of a system 400, which can be implemented in accordance with a preferred embodiment. System 400 can be composed of four major parts. The first part is a web page 402 built into the rendering device 404 (e.g., a printer) that allows an administrator to configure all, or a subset thereof, the driver features for propagations to the computers to which the driver 408 will be installed. For example, rendering device 404 can be implemented as rendering device 104 depicted in FIG. 1 and driver can be installed on computers 102, 106 and/or computer 110. The second component of system 400 is a file 406 that can be downloaded from rendering device 404 containing appropriate settings.

The third component of system 400 can be, for example, a configuration tool 410 that is in charge of downloading the file 406 from rendering device 404 and parsing it for the features that the driver 408 will need to pre-configure. The fourth component of system 400 is the driver 408 itself, which can parse to change the default settings accordingly and then complete the installation thereof.

Several example scenarios can be described, which implement the embodiments disclosed herein. In a first scenario, a user A can install printer 20 and prints a two-page document. To accomplish such a task, the user initially inserts a CD into his or her computer and initiates an "install" program. The user then selects printer 20 from the install program. The installer program or application then installs the driver and the configuration tool (e.g., configuration tool 410) for printer 20. Thereafter, prior to completion of the driver installation, the configuration tool contacts printer 20 to query for the default driver configuration settings. At this point, the default driver configuration is not configured on printer 20, therefore no settings are changed. The printer driver installation thus completes as normal. The user then "opens" up a two-page document to print, and initiates completion of the two-page document. The two-page document prints via rendering device 404 without being duplexed, without a separation page, and without color management.

In a second scenario, for example, assume that network 100 of FIG. 1 utilizes approximately 20 printers networked thereof. Each such printer can be analogous, for example, to rendering device 404 depicted in FIG. 4. An administrator, for example, can configure the default driver configuration in printer 10. The web page 402 depicted in FIG. 4 can be opened and accessed by an administrator. The Administrator then browses to a default driver configuration page, which can be, for example, the web page 402 of FIG. 4. The Administrator then selects, for example, the duplex printing option. Thereafter, the user may decide to select separation pages for the start of the job, along with a setting that allows color management to be done by the device. The Administrator then uses the configuration page to enable the default driver configuration. The Administrator finally "clicks" to save the changes made.

In continuing the previous scenario, for example, a user B installs a printer 10 and prints a two-page document. User B begins by inserting the CD into his or computer to begin the installation process. The user selects printer 10 from the installation program. The installation process or application (i.e., the installer) begins installing the driver and configuration tool (e.g., configuration tool 410) for printer 10. Prior to completion of the driver installation, however, the configuration tool can contact printer 10 to query for default driver configuration settings as set in the first scenario.

The Default driver configuration can be configured on printer 10, so the PostScript Printer Description (PPD) for the driver can be parsed and modified to account for the administrator's elections for the default driver configuration settings. The installation is thus completed. The user can then open up a two-page document to print. The user prints the two-page document. A separation page is printed first by the printer or rendering device. The two-page document can then be printed in a duplexed format and with color management handled by the printer or rendering device.

Note that although the PPD for the driver can be parsed and modified as indicated above during the installation process, it can be appreciated that the default driver configuration settings can be additionally modified after installation is complete. Such a modification of the default driver configuration settings can be independent of any PPD restrictions for the driver. Thus, an additional step of modifying the driver default configuration after the installation of said driver default configuration can be implemented, depending upon design considerations and the needs and goals of the user and/or administrator.

It is also important to note that although the PPD for the driver can be parsed and modified as indicated above during the installation process, it can be appreciated that the driver features can be additionally constrained after installation is complete. Such a constraint of the driver features would render such features unavailable from within the driver.

In general, the embodiments disclosed herein relate to methods and systems for automatically configuring a printer driver's settings. A device administrator can first specify the device driver's default configuration. The driver configuration is generally kept on the device itself and is accessible and modifiable by the system administrator via the device's web page. During the driver installation process, the device's printer driver installer queries the device to acquire the default driver configuration. The installer then installs the driver with these settings. The advantage of such embodiments is the ability to efficiently manage specifying the default settings of a printer driver in a multiple user environment, such as, for example, the peer-to-peer network 100 depicted in FIG. 1 and/or other types of computer networks.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The embodiments of the invention in which an exclusive property or right is claimed are defined as follows. Having thus described the invention claimed is:

1. A method, comprising:

storing a driver within a rendering device at compile time wherein said driver includes a driver default configuration comprising an Extensible Markup Language (XML) file containing pre-selected features and options related said rendering device;

setting said driver feature default configuration associated with said driver in said rendering device via an embedded network server, wherein said embedded network server is located within said rendering device;

querying said rendering device for said driver feature default configuration stored in said rendering device upon initialization of installation of said driver onto a data-processing apparatus operably connected to said rendering device through a network;

parsing said driver default configuration for features required by said driver for configuration, wherein said driver default configuration comprises PostScript Printer Description (PPD);

automatically adjusting said driver based on said driver feature default configuration prior to completion of installation of said driver, in response to querying said rendering device; and thereafter rendering a document via said rendering device based on said automatically adjusted driver feature default configuration unless otherwise modified by a user thereof.

2. The method of claim 1 further comprising modifying said driver feature default configuration after an installation of said driver feature default configuration.

3. The method of claim 1 further comprising constraining at least one of said pre-selected features and options from being altered after an installation of said driver.

4. The method of claim 1 further comprising configuring said rendering device as a printer.

5. The method of claim 1 further comprising configuring said rendering device as a scanner.

6. The method of claim 1 further comprising configuring said rendering device as a multi-function rendering device.

7. The method of claim 1 further comprising configuring said embedded network server as an embedded web server.

8. A system, comprising:

a device driver stored within a rendering device, wherein said driver includes a driver default configuration comprising an Extensible Markup Language (XML) file containing pre-selected features and options related said rendering device;

an embedded network server, wherein said driver default configuration is initially set in said rendering device via said embedded network server, such that said embedded network server is located within said rendering device;

an instruction module residing in a computer memory for querying said rendering device for said driver default configuration stored in said rendering device upon initialization of installation of said driver onto a data-processing apparatus operably connected to said rendering device through a network;

a configuration tool for parsing said driver default configuration for features required by said driver for configuration; and an instruction module residing in said computer memory for automatically adjusting said driver based on said driver default configuration prior to completion of installation of said driver, in response to querying said rendering device for said driver default configuration, thereby permitting a driver thereof to be automatically configured upon installation of said driver, regardless of the technique utilized to install said rendering device.

9. The system of claim 8 wherein said rendering device comprises a printer.

10. The system of claim 8 further wherein said rendering device comprises a scanner.

11. The system of claim 8 further comprising configuring said rendering device as a multi-function rendering device.

12. The system of claim 8 wherein said embedded network server comprises an embedded web server.

13. The system of claim 9 wherein each of said instruction modules is processible upon an initial use of said driver.

14. The system of claim 9 wherein said network comprise a peer-to-peer network.

15. A system, comprising: a web page stored in a rendering device having driver settings thereof, wherein said web page allows a user to configure all or at least a subset of said driver settings of said rendering device by selecting from among a group of settings for configuring said driver settings; at least one XML-based file that is downloadable from said rendering device, wherein said data file contains said driver settings, which are modifiable after said installation of said rendering device; a configuration tool for downloading said data file from said rendering device and parsing said data file for said driver" settings prior to installation of a driver onto a data-processing apparatus; and wherein said driver parses and alters said settings associated with said rendering device and thereafter completes an installation of said driver.

16. The system of claim 15 wherein said settings associated with said rendering device are constrainable after said installation of said rendering device.

* * * * *